United States Patent [19]

George

[11] Patent Number: 4,901,909

[45] Date of Patent: Feb. 20, 1990

[54] FLUX AND PROCESS FOR BRAZING ALUMINUM MATERIAL

[75] Inventor: Gary W. George, Mentor, Ohio

[73] Assignee: Fusion Incorporated, Willoughby, Ohio

[21] Appl. No.: 372,287

[22] Filed: Jun. 27, 1989

Related U.S. Application Data

[63] Continuation-in-part of Ser. No. 233,567, Aug. 18, 1988.

[51] Int. Cl.$^4$ ............................................ B23K 35/363
[52] U.S. Cl. ...................................... 228/223; 228/224; 228/248; 148/24; 148/26
[58] Field of Search ................... 228/223, 224, 263.17, 228/183, 248; 75/257; 148/23, 24, 26

[56] References Cited

U.S. PATENT DOCUMENTS 4,643,348  2/1987  Takahashi ........................... 228/223

FOREIGN PATENT DOCUMENTS 529290  8/1956  Canada ................................. 228/223
24283  1/1908  United Kingdom ................ 228/223

Primary Examiner—Nicholas P. Godici
Assistant Examiner—Samuel M. Heinrich
Attorney, Agent, or Firm—Watts, Hoffmann, Fisher & Heinke Co.

[57] ABSTRACT

The instant flux and paste containing same are for brazing aluminum material. The flux consists essentially of a particulate blend of aluminum fluoride, potassium fluoride, and cesium chloride, or rubidium chloride or a mixture of cesium chloride and rubidium chloride, the fluorides being complexed with each other or not complexed or being a mixture of the complexed and not complexed fluorides. Lithium fluoride, preferably complexed with the other fluorides, is an optional ingredient. The weight fraction of the total fluorides is between about 1/10 and about 9/10, and the AlF$_3$-KF weight ratio is between about 4:1 to about 0.4:1.

37 Claims, No Drawings

FLUX AND PROCESS FOR BRAZING ALUMINUM MATERIAL

REFERENCE TO OTHER APPLICATIONS

This application is a continuation-in-part of applicant's Ser. No. 07/233,567, filed on Aug. 18, 1988, entitled *Flux for Joining Aluminum Material and Joining Process Therewith*.

FIELD OF THE INVENTION

This invention relates to a flux useful for brazing an aluminum material, i.e., aluminum or an aluminum alloy, and such brazing process, particularly one that is automated.

BACKGROUND OF THE INVENTION

In the brazing of an aluminum material one uses a brazing alloy which has a melting point that is somewhat lower than that of the aluminum material being brazed. A typical brazing alloy is a eutectic alloy of aluminum and silicon. The flux rids the aluminum material and brazing alloy of braze-inhibiting substances such as oxide films.

A popular flux today is composed of a $KF-AlF_3$ complex or complexes; it melts at 560° C. or above. Brazing under a blanket of inert gas, e.g., nitrogen, is usual with this flux. For lower-melting fluxes lithium and cesium have been reacted-in (complexed) as fluoaluminates and applied to the workpieces in various ways, e.g., in particulate or aqueous form.

In the past, some frequently-used flux materials for brazing aluminum were mixtures of chlorides such as zinc chloride and sodium chloride with fluorides. The current brazing practice seems to have turned its back on the use of chlorides, presumptively because they got the reputation of sometimes corroding the aluminum material. Additionally, collateral brazing technology (not the brazing of aluminum material) utilizing cesium and rubidium fluorides teaches expressly to avoid the use of the corresponding chlorides of these metals because they tended to form slags and other residues which are detrimental to the brazing.

Now I have found ways to use these two chlorides, CsCl and RbCl, in the brazing of an aluminum material quite successfully—surprisingly without the aforementioned detractions from performance; and, furthermore, with an ability to braze (in many cases without the use of an inert gas blanket) a wider than previous range aluminum material compositions; and also to use a wider than previous range of brazing alloys (often called "filler metal"). Some of this stems from surprisingly low flux melting points attainable.

BROAD STATEMENT OF THE INVENTION

The flux of this invention consists essentially of: a particulate blend of aluminum fluoride, potassium fluoride, and the chloride selected from the group consisting of cesium chloride, rubidium chloride and mixtures of cesium chloride and rubidium chloride, the weight fraction of the aluminum fluoride plus potassium fluoride being between about 1/10 and about 9/10, the weight ratio of the aluminum fluoride to the potassium fluoride being between about 4:1 and about 0.4:1.

Advantageously the flux is formulated to have a melting point that is not substantially above about 510° C. or even about 500° C., e.g. not more than 5° C. above those temperatures. Preferably the melting point of the cesium chloride-containing flux is not substantially above about 480° C., and that of the rubidium chloride-containing flux is not substantially above about 500° C. Even lower flux melting points can be attained, e.g., 465°–470° C., and lower, and these are highly preferred for some uses.

In this flux both the aluminum fluoride ($AlF_3$) and the potassium fluoride (KF) can be in the form of particles of the free fluorides, as particles of one or more fluoaluminate complexes or as a mixture of such complexed and not complexed (free) particles. The complexes can be of the most widely used types made by the high temperature preparations of, e.g., U.S. Pat. Nos. 3,951,328, 3,971,501, 3,971,657, 4,475,960, 4,556,165, 4,579,605, 4,619,716, 4,655,385, 4,670,067 and 4,689,092; they also can be made by the low temperature preparation of UK Pat. No. 1,055,914 (1967).

The instant flux need not have any lithium fluoride in it; preferably it has none, but it may contain, on an optional basis, up to about 10% by weight of that material. If lithium fluoride is present, it preferably is complexed with the aluminum and potassium fluorides; typically it can be used in a concentration of about 1-10% by weight of the flux.

The inventive flux preferably is compounded with filler metal and paste vehicle to make a brazing paste.

To make a brazed aluminum metal surface, or to join a plurality of such surfaces together by brazing, one deposits the paste or the flux and filler metal on such surfaces and heats to a brazing temperature that is above the melting points of the flux and the filler metal, then allows the filler metal to solidify.

BEST MODES FOR CARRYING OUT THE INVENTION

The following examples show preferred ways in which I have made and used the invention, both as a particulate flux and as a brazing paste for the brazing of aluminum. In this specification all parts are parts by weight, all ratios are weight ratios, all percentages are weight percentages, and all temperatures are in degrees Celsius unless otherwise expressly stated. The flux materials used in the examples were technical grade, anhydrous for practical purposes, but having a minute impurity content including water.

EXAMPLE 1

A flux was mixed to form a blend using the following pulverulent free compounds:

| Compound | Parts |
|---|---|
| $AlF_3$ | 1.8 |
| KF | 2.2 |
| CsCl | 6 |

The resulting flux, 1 part, was blended with 1 part of aluminum-silicon eutectic (brazing) alloy powder, and the mixture was deposited on the 6.45 square cm. circular tops of 1.6 mm. thick type 3003 aluminum metal test blanks using 0.2 gram of the flux and alloy powder blend per blank.

The loaded blanks were heated up in air with a natural gas-air torch to 600° C. in 15 seconds, held there for about 5 seconds, then allowed to cool in room air to room temperature. Melting of the flux occurred at about 485° C. The pieces were examined, then stored unprotected from air at room temperature for a year and reexamined then and later. The brazing alloy adhered well and smoothly. Neither it nor the aluminum substrate were disfigured or substantially discolored or indicated any significant corrosion upon these inspections. The deposition and brazing in air seemed to do nothing bad to the use of the flux or the resulting braze.

EXAMPLE 2

The test of Example 1 was repeated, but with a particulate free cesium chloride-potassium fluoaluminate complex that was equivalent in weight and proportions to the free compounds flux blend of Example 1. The complex was made essentially as taught in U.S. Pat. No. 3,951,328. The results were essentially the same as those of Example 1 with, however, the melting point of the flux being about 465° C. The loaded blanks were heated up to 600° C. in about 15 seconds, held there for about 5 seconds, then allowed to cool to room temperature. The flux recipe was:

| Compound | Parts |
| --- | --- |
| AlF$_3$ equivalent in complex | 1.8 |
| KF equivalent in complex | 2.2 |
| CsCl (free) | 6 |

EXAMPLE 3

The test of Example 1 was repeated, but with rubidium chloride used instead of cesium chloride, and using this flux blend recipe:

| Compound | Parts |
| --- | --- |
| AlF$_3$, free | 3.8 |
| KF, free | 3.2 |
| RbCl, free | 3 |

The melting point of the flux was 500° C. The loaded blanks were heated up to 600° C. in about 15 seconds, held there for about 5 seconds, then allowed to cool to room temperature. The observations and results were substantially the same as those for Example 1.

EXAMPLE 4

The test of Example 2 was repeated, but with rubidium chloride instead of cesium chloride, and in this flux recipe:

| Compound | Parts |
| --- | --- |
| AlF$_3$ equivalent in complex | 3.8 |
| KF equivalent in complex | 3.2 |
| RbCl free | 3 |

The melting point of the flux was 495° C. The loaded blanks were heated up to 600° C. in about 15 seconds, held there for about 5 seconds, then allowed to cool to room temperature. The observations and results were substantially the same as those for Example 1.

EXAMPLE 5

An essentially anhydrous brazing paste was formulated by intimately blending parts A, B and C, below.

Part A, the paste vehicle, was conventional, specifically solid grade polyisobutylene ground and heated to obtain practical homogeneity in mineral spirits. The latter was a liquid aliphatic hydrocarbon distillate having Boiling Range between about 240 and about 260° C. The resulting dispersion or solution had 21 parts of the mineral spirits per 3 parts of the polyisobutylene.

Part B was the filler metal, specifically 40 parts of American Welding Society BAlSi-4 alloy particles all passing through a 40 mesh (U.S. Std. Sieve Series) screen.

Part C was the particulate flux, specifically a blend of 6 parts of AlF$_3$, 8 parts of KF, and 22 parts of CsCl, the fluorides being free and not complexed with each other.

Test pieces of type 3003 aluminum were brazed together by applying a small bead of the paste to the seam where the pieces met. The assembly was heated in air with a natural gas-air torch to 600° C. in 15 seconds. The hot assembly was held for there for about 5 seconds, then allowed to cool in room air to room temperature. The flux had a melting point of 485° C.

The brazed joint was good, smooth, hardly discolored, and gave no evidence of corrosion then and a year later. When hot, much of the brazing residue could be washed off the joint with a stream of water, if desired.

When a like test was performed, except that the fluorides were complexed with each other essentially as taught in U.S. Pat. No. 3,951,328, the results were practically like those of Example 5 except that the flux melting point was 465° C. The flux could be used to braze aluminum material containing up to about 2½% magnesium.

This formulation had a consistency that permitted its ready dispensing and application to various workpieces in an automated manner, e.g., by extrusion through an orifice. When all the readings on the paste at operating temperature (usually room temperature) are below 100 using a Model HAF Brookfield viscosimeter with a TE spindle at 5 rpm., the consistency is suitable for such dispensing.

The broad range for the AlF$_3$ plus KF in the flux has been set forth above. Narrower useful values for the AlF3 plus KF content of the flux containing CsCl and/or RbCl are: about 3/10–9/10; and about 7/20–7/10. For a flux containing CsCl to the exclusion of RbCl the preferred AlF$_3$ plus KF content is about 4/10. For a flux containing RbCl to the exclusion of CsCl the preferred AlF$_3$ plus KF content is about 7/10.

The broad range for the weight ratio of AlF$_3$ to KF in the flux has been set forth above. A narrower useful range for that ratio is about 0.5:1 to 3:1. For a flux containing CsCl to the exclusion of RbCl, the preferred such ratio is about 0.8:1. For a flux containing RbCl to the exclusion of CsCl the preferred such ratio is about 1.2:1.

Desirably the paste vehicle is substantially completely fugitive at the brazing temperature. Organic vehicles are the usual ones for this service. Thus, very little or none of its residue remains in place after brazing for possible cleanup. At brazing temperature such fugitive vehicle is fluent, i.e. it flows away from the brazed area in liquid form and/or as volatiles such as products of pyrolysis and/or combustion. Preferably the vehicle is rich in or completely constituted of hydrocarbons and it will be essentially anhydrous. However, other organic materials can be used in the vehicle, e.g. various oxygenated hydrocarbon materials such as ethers, esters, alcohols and ketones, typically alkylene oxide condensation products, glycol ethers, cetyl alcohol, sterols and synthetic waxes. These substances usually are pasty and sometimes exhibit a waxiness, but some even can be liquid to act as a plasticizer.

The inventive CsCl-and/or RbCl-rich fluxes lend themselves to a higher degree of manipulation as to viscosity, non-newtonian flow such as thixotropy or the suppression of it or blendability with the filler metal and the paste vehicles than do the straight fluorides or their complexes. Perhaps this is in part due to the substantial presence of the chloride. The instant fluxes can be manipulated in proportions and particle size apart from the essential fluorides or their complexed products. The good properties also may be due at least in part to the fact these chlorides plainly are different substances than the conventional fluoride materials. Whatever the reasons, such fortuitous opportunity is a welcome one, especially when it is coupled with the other advantages of the inventive flux. These include ability to formulate for a comparatively low melting point, the ability to do some brazing in air, and the ability to braze a wide range of aluminum alloys satisfactorily.

Admittedly, cesium chloride is more water sensitive than a conventional $AlF_3$-KF complex. However, when the flux is present in an essentially anhydrous brazing paste like the preferred ones here, it is quite well protected from significant damage, etc. from atmospheric moisture. And even when the instant flux is used simply with aluminum brazing alloy and no protective vehicle, it is adequately resistant to hydrolysis, etc. if it is given only a modest or short time exposure to room air, as demonstrated by the examples. Other fugitive protectants also can be used with the flux, e.g., rosin, petrolatum, acrylic resins such as polymethacrylates, etc.

In summation, the instant paste with the instant flux should have at least one part of flux per nine parts of filler metal to be practical, and preferably about 1:1 parts of each; the filler metal in the paste can constitute about 10-60%, advantageously about 25-55%, preferably about 30-45% and typically 40%; the vehicle of the paste can constitute about 10-70%, advantageously 15-50%, preferably about 20-40%, and typically 24%; and the flux in the paste can constitute about 5-80%, advantageously about 20-45%, preferably 25-40%, and typically 36%. Usually the filler metal has a higher melting point than that of the flux; often it is 20° C. higher or even much more. However, brazing can be done in some cases where the melting point of the filler metal is lower than that of the flux.

Modifications and variations of the invention will be apparent to those skilled in the art in the light of the foregoing detailed disclosure. Therefore, it is to be understood that, within the scope of the appended claims, the invention can be practiced otherwise than as shown and described.

I claim:

1. A flux for brazing the metal surfaces of an aluminum material, the flux consisting essentially of a particulate blend of aluminum fluoride, potassium fluoride, and the chloride of at least one Group 1A metal having an atomic number of either 37 or 55, the weight fraction of the total fluorides being between about 3/10 and about 9/10, the weight ratio of the aluminum fluoride to the potassium fluoride being between 4:1 and 0.4:1.

2. The flux of claim 1 wherein the fluorides are not complexed with each other.

3. The flux of claim 1 wherein the fluorides are complexed with each other.

4. The flux of claim 1 wherein part of the fluorides are complexed with each other and part are not.

5. The flux of claim 1 wherein the Group 1A metal is cesium, and the melting point of the flux is not substantially above about 500° C.

6. The flux of claim 1 wherein the Group 1A metal is rubidium, and the melting point of the flux is not substantially above about 500° C.

7. A flux for coating or joining by brazing surfaces of an aluminum material, the flux consisting essentially of about 1-10% of lithium fluoride and a particulate blend of aluminum fluoride, potassium fluoride, and a chloride selected from the group consisting of cesium chloride, rubidium chloride, and a mixture of cesium and rubidium chlorides, the weight fraction of the total fluorides in said blend being between about 3/10 and about 9/10, the weight ratio of the aluminum fluoride to potassium fluoride in said blend being between 4:1 and 0.4:1.

8. A paste composition for coating or joining surfaces of aluminum material by brazing, the composition comprising particulate brazing alloy filler metal having a melting point lower than that of the surfaces being brazed and the flux of claim 1, 2, 3, 4, 5, 6, or 7 dispersed in a paste vehicle.

9. A paste composition for coating or joining surfaces of an aluminum material by brazing, the composition comprising:
the flux of claim 1, 2, 3, 4, 5, 6 or 7;
particulate aluminum brazing alloy filler metal having a melting point lower than that of the surfaces to be brazed; and
an organic paste vehicle that is fugitive at brazing temperature, the paste composition being essentially anhydrous.

10. The paste of claim 9 wherein the flux constitutes about 5-49% by weight of the paste.

11. The paste of claim 9 wherein the aluminum material to be brazed contains up to about 2½% magnesium.

12. The paste of claim 9 wherein the weight ratios of the filler metal to the vehicle to the flux are about 1:1:1.

13. A method for coating or joining by brazing surfaces of an aluminum material disposed for brazing which comprises depositing on said surfaces a paste composition comprising a flux of claim 1, 2, 3, 4, 5, 6 or 7, particulate aluminum brazing alloy filler metal having a melting point lower than that of the surface to be brazed, and an organic paste vehicle that is fugitive at brazing temperature, the paste composition being essentially anhydrous, heating the resulting paste deposit to a temperature above the melting points of the flux and the filler metal, then allowing the filler metal to solidify.

14. The method of claim 13 wherein the base metal contains about up to about 2½ weight percent magnesium.

15. The method of claim 13 wherein the flux blend contains about 30-65 weight percent cesium chloride.

16. The method of claim 13 wherein at least the depositing of the paste is automated.

17. The method of claim 13 wherein the brazing is done in the presence or the absence of an inert gas blanket.

18. In coating or joining aluminum material by brazing with a flux, the improvement wherein the flux used is the flux of claim 1, 2, 3, 4, 5, 6 or 7.

19. The improvement of claim 18 wherein the aluminum to be brazed contains up to about 2½% magnesium.

20. In coating or joining an aluminum material by brazing with a paste, the improvement wherein the paste used has a composition comprising the flux of claim 1, 2, 3, 4, 5, 6 or 7, particulate aluminum brazing alloy filler metal having a melting point lower than that of the surfaces to be brazed, and an organic paste vehicle that is fugitive at brazing temperature, the paste being essentially anhydrous, and the paste is applied automatically to the workpieces.

21. The improvement of claim 20 wherein the flux constitutes about 5–49% by weight of the paste.

22. The improvement of claim 20 wherein the aluminum to be brazed contains up to about 2½% magnesium.

23. The improvement of claim 20 wherein the weight ratios of the filler metal to the vehicle to the flux are about 1:1:1.

24. In the brazing of an aluminum material with a paste, the improvement wherein the paste used is a paste of claim 8.

25. The method of claim 13 wherein the flux blend contains about 30–65 weight percent rubidium chloride.

26. A flux for brazing the metal surfaces of an aluminum material, the flux consisting essentially of a particulate blend of aluminum fluoride, potassium fluoride, a chloride selected from the group consisting of cesium chloride, rubidium chloride and mixtures of same, zero to about 10% by weight lithium fluoride, the weight fraction of the aluminum fluoride plus potassium fluoride being between about 1/10 and about 9/10, the weight ratio of the aluminum fluoride to the potassium fluoride being between about 4:1 and about 0.4:1.

27. A flux for brazing the metal surfaces of an aluminum material, the flux consisting essentially of a particulate blend of aluminum fluoride, potassium fluoride, a chloride selected from the group consisting of cesium chloride, rubidium chloride and mixtures of same, zero to about 10% by weight of lithium fluoride, and the weight fraction of the aluminum fluoride plus potassium fluoride being between about 7/20 and about 7/10, the weight ratio of the aluminum fluoride to the potassium fluoride being between about 3:1 and about 0.5:1.

28. A flux for brazing the metal surfaces of an aluminum material, the flux consisting essentially of a particulate blend of aluminum fluoride, potassium fluoride, and cesium chloride, zero to about 10% by weight of lithium fluoride, and the weight fraction of the aluminum fluoride plus potassium fluoride being about 4/10, the weight ratio of the aluminum fluoride to the potassium fluoride being about 0.8:1.

29. A flux for brazing the metal surfaces of an aluminum material, flux consisting essentially of a particulate blend of aluminum fluoride, potassium fluoride, and rubidium chloride, zero to about 10% by weight of lithium fluoride, and the weight fraction of the aluminum fluoride plus potassium fluoride being about 7/10, the weight ratio of the aluminum fluoride to potassium fluoride being about 1.2:1.

30. The flux of claim 26, 27, 28 or 29 wherein the fluorides are complexed with each other, or are not complexed with each other, or part of them are complexed with each other and part are not.

31. The flux of claim 26, 27, 28 or 29 wherein the melting point of the flux is not substantially above about 510° C.

32. A paste composition for coating or joining surfaces of aluminum material by brazing, the composition comprising particulate brazing alloy filler metal having a melting point lower than that of the surfaces being brazed and the flux of claim 26, 27, 28 or 29 dispersed in a paste vehicle, the fluorides of the flux being complexed with each other, or being not complexed with each other, or being in part complexed and in part not complexed with each other.

33. The paste of claim 32 wherein the vehicle is organic and fugitive at the brazing temperature.

34. The paste of claim 32 wherein the vehicle comprises a hydrocarbon and is essentially anhydrous.

35. The paste of claim 32 wherein the flux constitutes about 5–80% by weight.

36. In a method for coating and joining aluminum material by brazing wherein a flux is used, the improvement wherein the flux used is the flux of claim 26, 27, 28 or 29.

37. A method for coating or joining by brazing the surfaces of an aluminum material disposed for brazing which comprises depositing on said surfaces a paste composition comprising a flux of claim 26, 27, 28 or 29 particulate aluminum brazing alloy filler metal having a melting point lower than that of the surface to be brazed, and a paste vehicle that is fugitive at brazing temperature, heating the resulting paste deposit to a temperature above the melting points of the flux and the filler metal, then allowing the filler metal to solidify.

* * * * *